Dec. 1, 1964  A. P. DOWLING  3,159,500
METHOD OF CONVERTING A POLYESTER COATING
Filed June 5, 1957
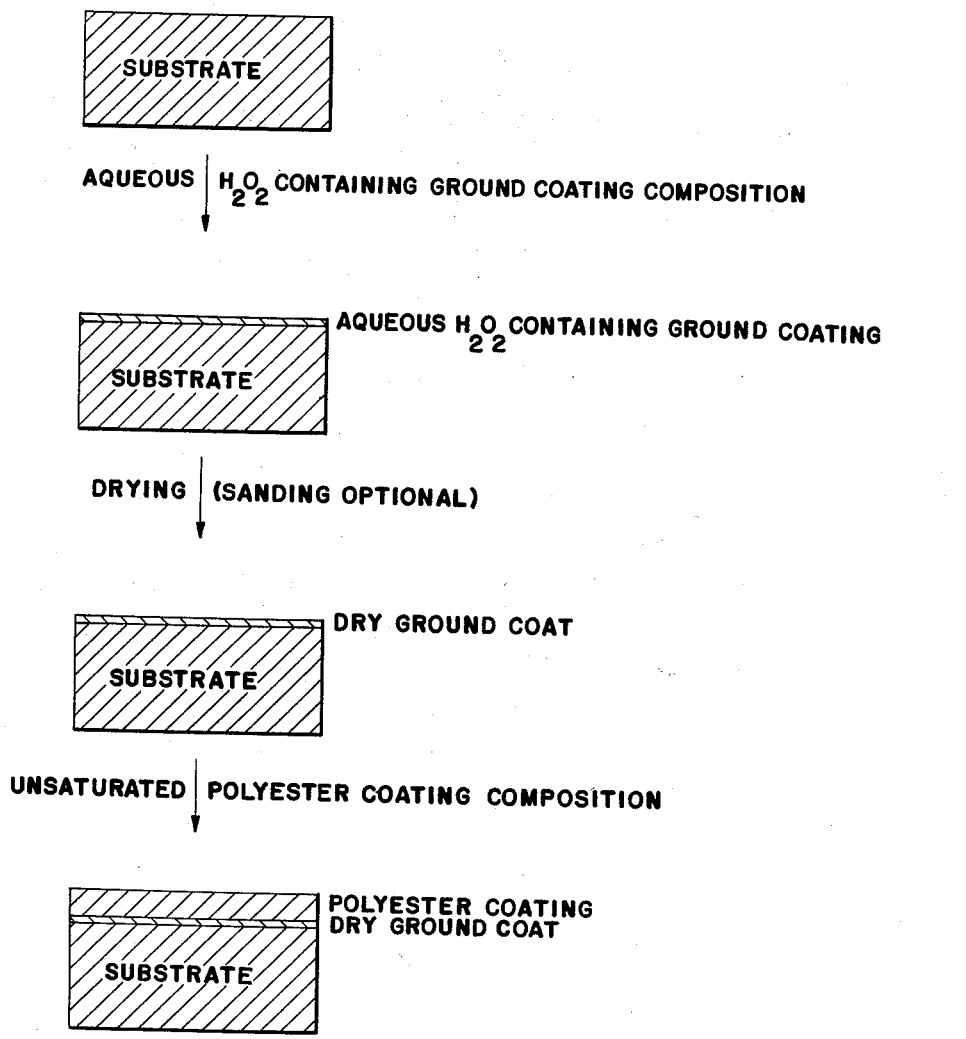
INVENTOR.
ARTHUR P. DOWLING
BY Charles E Carney
ATTY United States Patent Office 3,159,500
Patented Dec. 1, 1964

3,159,500
METHOD OF CONVERTING A POLYESTER COATING
Arthur P. Dowling, Chicago, Ill., assignor to The Glidden Company, Cleveland, Ohio, a corporation of Ohio
Filed June 5, 1957, Ser. No. 663,600
7 Claims. (Cl. 117—72)

This invention relates to a method of converting an ethylenically unsaturated coating material such as a polyester coating. It relates more particularly to a method of coating a surface by applying a two-part coating, one an undercoating such as a primer to said surface, and thereafter a polymerizable coating as defined, which method, when practiced in accordance with my invention, eliminates the main disadvantages and objections heretofore characteristic of polymerizable-type coatings.

The drawing is a flow sheet diagrammatically illustrating the invention.

Polyester resins are highly desirable in the field of protective coatings. These resins, by virtue of their physical and chemical characteristics, or characteristics which can be imparted to them, such as toughness, flexibility and solvent resistant properties, make excellent protective coatings. They are resins obtained by the polycondensation of polycarboxylic acids with polyhydroxy alcohols and are a special type of alkyd resin characterized by their ability, when catalyzed, of curing or hardening at ordinary room temperature. As such, they contain ethylenic unsaturation and are ordinarily not modified with drying oils and the like. They are further characterized by being substatnially 100 percent convertible with a compatible monomer also containing ethylenic unsaturation, i.e., a polymerizable compound containing aliphatic carbon-to-carbon unsaturation, to yield cross-linked thermosetting resins which when fully cured are insoluble and infusible.

The use of polyester resins in protective coatings also has the added advantage over other resinous coating materials in that the polyester, when applied to a surface, is substantially completely convertible and therefore can be applied in the desired thickness in one coating without the disadvantageous characteristic of other resins applied in conjunction with thinners, solvents and the like which ordinarily result in loss of material on application to a surface, thereby requiring further application of such coatings to obtain the desired surface coat thickness.

Although there are many advantages to be realized by the use of polyester protective coatings, they are to some extent offset by certain disadvantages in the application of these polyesters. Thus, the catalyst for the final curing of the unsaturated polyester-monomer solution is added shortly before the resin is used in order to prevent premature cross-linking. The addition of the catalyst more or less causes rapid polymerization, thus affecting the pot life of the mixture and this, of course, limits the working life of the material. In this connection, various schemes have been employed for alleviating this problem, e.g., the use of catalyst spray guns, addition of polymerization inhibitors, etc., but these procedures have either resulted in increased costs in applying this type of coating or are disadvantageous from the standpoint of weighing, mixing, applying, and, in general, the uncertainty and complexity of converting the catalyzed film.

One object of my invention is, accordingly, the elimination of these prior art objections in the application of a polymerizable resin as a protective coating.

Another object of my invention is the provision of a novel method for coating with a polyester-type resin which is simple and eliminates special techniques heretofore considered necessary.

A further object of my invention is the provision of a novel method for applying a two-part coating system to a surface which eliminates certain objectionable features heretofore encountered.

I have found that by incorporating or dissolving a polymerization catalyst in a base coating composition, applying it to a surface to be coated, and thereafter applying a coating composition of the type comprising ethylenic unsaturation that I can effectively overcome the disadtages encountered heretofore with coatings of this type. By the method of my invention, I have succeeded in solving the objectionable features encountered heretofore in the application of a protective coating to a surface which requires the presence of a catalyst to effect the polymerization and cross-linking of the composition to gel and cure it.

My method of applying a protective two-part coating to a surface finds application in surfaces such as wood, metals, concrete, brick, Masonite, and the like, i.e., any surface requiring a base coating or primer.

In a broad embodiment of my invention, I have found that I can disperse or dissolve a polymerization catalyst in a base coating composition, said catalyst being substantially inactive toward said composition and said composition being effective in adhering to a surface to be coated and to an uncatalyzed composition comprising ethylenic unsaturation to be subsequently applied, the catalyst being effective in gelling and curing said latter composition to result in a thin film or protective coating possessing desired physical and chemical characteristics.

My invention comprises incorporating a polymerization catalyst in a liquid effective as a base coating, primer or sealer and applying this to the surface to be coated so that a subsequently applied polymerizable resin coating is catalyzed and caused to set or cure by the polymerization catalyst in the primer coating or carrier. Obviously it is preferred that the catalyst exhibit no effect on the primer or carrier, i.e., that the latter be inert or substantially inert towards the catalyst; however, in some instances, some minor activity can be tolerated provided that the catalyst continues to function to substantially completely cure the top catalyzable or polymerizable coating. Thus, any suitable base coating liquid composition, functioning substantially as described, is applicable in the two-part coating process of my invention.

My invention also contemplates the incorporation of the polymerization catalyst in the polymerizable resin, in which case the accelerator (cobalt, dimethyl amine, mercaptan, etc.) and the cross-linking monomer are incorporated in the sealer. This system, however, is slower, and consequently the preferred mode of operation is to incorporate the polymerization catalyst in the sealer as described above and as shown in the examples to follow.

Exemplary of various suitable polymeric coating compositions that can be adapted as carriers for the polymerization catalysts, e.g., organic peroxides, are nitrocellulose, epoxypolyamide compositions, polyvinyl butyral resins, polyvinyl alcohol, polyvinyl pyrrolidone in 25% alcohol solution (available from General Aniline and Film Corp.), styrenated alkyd, medium oil length soya, tall oil acid DCO-alkyd, rosin-maleic-phenolic-DCO-alkyd, short oil linseed alkyd and the like. The abbreviation DCO denotes dehydrated castor oil. Thus, it is to be understood that my invention is not limited to any particular organic sealer, primer or base coat but is applicable with any of these base coating materials that are inert toward the catalyst or substantially so and function to adhere as a film to a wood or metal substrate and upon which a polymerizable polyester resin coating can be applied, as will be understood by those skilled in the art of protective coatings.

Hereafter, specific examples of some of these base coatings will be given in order to illustrate the invention more fully. Since my invention is not directed to novel base coating compositions, resort may be had to the prior art for the preparation of these known coating compositions. In the interest of clarity, however, it can be mentioned here that epoxy-polyamide combinations can be made generally as described in U.S. Patent No. 2,707,708. The epoxy moiety of the resinous material is preferably composed of polyether derivatives of one or more dihydric phenols with polyfunctional halohydrins. The preparation of such epoxy resins is described, for example, in Greenlee Patent No. 2,521,911, and various complex epoxy resins are currently available as commercial products under the trade name "Epon Resins" obtainable from the Shell Chemical Co.

The polyamide moiety of the epoxy-polyamide coating is prepared generally by reacting polycarboxylic acids with polyalkylene polyamines as heretofore described in U.S. Patents Nos. 2,364,204; 2,518,148; 2,149,286; and 2,450,940. The epoxy and polyamide resins are combined and reacted to form an epoxy-polyamide coating composition as heretofore taught in U.S. Patent No. 2,707,708, supra.

The polyvinyl butyral resins, which are excellent as coatings for various metals, i.e., as primers and specialized sealers, are made by partially hydrolyzing polyvinyl acetate and then reacting it with butyraldehyde. Generally, therefore, any suitable base coating material can be employed both as a primer coating and as a carrier for the polymerization catalysts in the process of my invention.

Although my invention is applicable to protective coatings of the type comprising a resin containing ethylenic unsaturation and requiring the addition of a polymerization catalyst to effect gelling and curing, reference will be made hereinafter to polyester resins since these constitute the type of coating materials possessing advantageous and desirable physical and chemical properties and are readily available in the commercial market.

Polyester resins of the type containing ethylenic unsaturation are made by condensing unsaturated acids with polyhydric alcohols. It is preferred to employ a dihydric alcohol and an unsaturated dicarboxylic acid in order to produce a product in which there is a maximum esterification of the acid and alcohol radicals without excessive viscosity. Ordinarily it is desirable that the unsaturated polyester be polymerizable into an infusible or high melting resin so that the proportion of unsaturated components should be such that the polyester contains an average of more than one double bond per molecule; for example, there can be an average of eleven or more double bonds in every ten molecules of the polyester.

The polymerizable unsaturated polyester can be produced by reaction of any desired combination of polycarboxylic acid and polyhydric alcohol. For example, an unsaturated dicarboxylic acid, such as maleic, fumaric, itaconic, citraconic or mesaconic, can be reacted with a dihydric alcohol, such as any polymethylene glycol in the series from ethylene glycol to decamethylene glycol, propylene glycol, any butylene glycol, any polyethylene glycol in the series from diethylene glycol to nonaethylene glycol, dipropylene glycol, and glycerol monobasic acid monoester (either in the alpha- or beta-position), such as monoformin or monoacetin, any monoether of glycerol with a monohydric alcohol, such as monomethylin or monoethylin, or any dihydroxy alkane in which the alcohol radicals are primary or secondary, or both, in the series from dihydroxy butane to dihydroxy decane.

The unsaturated dicarboxylic acids referred to above contain a polymerizable reactive $\Delta^{2,3}$-enedioyl group, and a polymerizable unsaturated polyester or alkyd prepared from any such acids contain a plurality of such polymerizable reactive $\Delta^{2,3}$-enedioyl groups. In other words, each of the acids contains a polymerizable reactive $\Delta^{2,3}$-enoyl group, i.e., a group having the structure C=C—C, and such groups are contained in dioyl radicals in the polyester molecule; hence, the dioyl radicals may be defined as $\Delta^{2,3}$-enedioyl radicals, e.g., butenedioyl or ethenedicarboxylyl radicals.

Instead of a single polycarboxylic acid, a mixture of polycarboxylic acids can be employed, such as a mixture of an unsaturated dicarboxylic acid with a polycarboxylic acid containing more than two acid radicals, such as citric acid. A mixture of polyhydric alcohols can be employed, such as a mixture of dihydric alcohol with a polyhydric alcohol containing more than two alcohol radicals, such as glycerol.

In the preparation of the polymerizable unsaturated polyester, any of the usual modifiers, such as monobasic acids, monohydric alcohols and natural resin acids, can be added. The larger the proportion of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules and the greater is the viscosity. The proportions of ingredients used are those proportions that produce a polymerizable polyester of the desired viscosity. Other properties of the polyester, such as solubility in various solvents, can also be varied by selecting various reacting ingredients and varying their proportions. The infusibility, hardness and inertness of the product obtained by polymerization of the polyester can be increased by varying the initial reacting ingredients to increase the average number of double bonds per molecule of the polymerizable polyester.

The point to which the reaction of the ingredients is carried in the preparation of the polymerizable polyester is simply to that point at which the product has the desired properties. The consistency or viscosity of the polyester varies directly with the average number of acid and alcohol residues in the molecule. For example, the average number of residues in the molecule of the polyester can vary from about three to about one hundred twenty.

The reaction is carried out at a temperature high enough and for a long time enough to secure the desired consistency. An elevated temperature is preferably employed to expedite the reaction, but during the preparation of the polyester, the temperature should not be so high or the time of reaction so long as to cause substantial polymerization. There is less danger of premature polymerization if an inhibiting agent is added before the reaction is carried out.

Whenever added, an inhibiting agent is used in proportions required to give the desired degree of inhibiting effect. It may be necessary to use different inhibitors in widely different proportions in order to secure the same inhibiting effect. Exemplary of the inhibitors that can be employed are hydroquinone, pyrogallol, tannic acid, aromatic amines, e.g., aniline, phenyl diamine and the like.

The preparation of the unsaturated polyester is preferably carried out in an atmosphere of inert gas, such as carbon dioxide, nitrogen and similar materials, in order to prevent darkening or to make it possible to obtain a pale or colorless product. Bubbling the inert gas through the reaction ingredients is advantageous in that the gas serves the added function of agitation and of expediting the removal of water formed by the reaction. Xylene can be used to aid in water removal. Exclusion of oxygen is desirable not only because it causes discoloration, but also because it tends to produce premature polymerization at the elevated temperatures employed.

The acid number of the product depends upon the degree of reaction and the proportions of acid and alcohol used for the reaction. When equimolar proportions of dibasic acid and dihydric alcohol are employed, the reaction can be carried to an acid number of about 20. The use of an acid catalyst can make it possible to attain a lower acid number without substantial polymerization. Modifications are numerous and include modification of the unsaturated polyester with saturated alkyd-type resins, oil-modified alkyd resins, etc.

In the preferred embodiment of my invention, the polyester resin, formed as above described, is modified with one or more liquid ethylenically unsaturated monomeric materials compatible and copolymerizable with said polyester. Exemplary of suitable cross-linking agents containing aliphatic carbon-to-carbon unsaturation are styrene, divinyl benzene, vinyl toluene and other nuclearly-substituted styrenes, viz., diallyl esters, such as diallyl phthalate, diallyl succinate, diallyl maleate, diallyl itaconate, etc., and other unsaturated esters, such as divinyl maleate, dioctyl itaconate, dibenzyl itaconate, and the like. Since the art of preparing such curable polymerizable materials and their compositions is well known, as shown by U.S. Patents Nos. 2,280,256; 2,225,313; 2,409,633; 2,420,740; 2,453,665; 2,512,410; 2,593,787; 2,635,089; 2,645,626; and U.S. patent applications Serial Nos. 377,265, filed August 28, 1953, now U.S. Patent 2,777,829, and 526,776, filed August 5, 1955, now U.S. Patent No. 2,852,487, no extended discussion is deemed necessary here except to point out that many of the polyester-monomer compositions (which are substantially 100% polymerizable) tend to polymerize more or less at room temperature, and hence are conventionally stabilized with various polymerization inhibitors. The inclusion of such inhibitors in effective amounts renders the liquid materials stable against polymerization for various periods of time, thereby enabling them to be manufactured and then stored until such time as they are to be used.

In prior methods of coating, it was conventional practice to add minor amounts of curing catalysts, e.g., benzoyl peroxide (at the time of applying the coating) and then applying the coating composition. The compositions containing such curing or polymerization catalysts polymerize fairly rapidly at room temperature, and faster at higher temperatures as known heretofore.

In general, polyester masses of the types herein described and illustrated above are 100% polymerizable and can frequently be mixtures of two or more unsaturated polyester types or formulations with or without polymerizable ethylenically-unsaturated monomeric material. Nevertheless, a single polyester type or formulation can be used by itself just as well. It is more common, though, to mix two or more different ones together, since in this way a few stock resin types or formulations can be maintained and from them a large number of blends can readily be prepared. The stock formulations are commonly distinguished from each other on the basis of the rigidity or flexibility of the resins they yield. Thus, one might give a flexible resin, another a semi-rigid resin and a third might give a rigid resin and their various blends give cured resinous coatings of various degrees of rigidity, selected for the type of service for which the finished product is intended. Those skilled in the art of formulating unsaturated polyester resins recognize that the proportions of saturated carboxylic acids to β-unsaturated carboxylic acids, the length of the carbon chain(s) involved in the carboxylic acids and in the polyhydric alcohols, the proportion of polyester to polymerizable unsaturated monomer, the type of unsaturated or ethylenic monomer, the degree of functionality in the carboxylic acids and polyhydric alcohols and the curing treatments, are all factors affecting the flexibility and/or rigidity of the cured resin.

The formulations of polyester resins prepared as above indicated and illustrated hereinafter in the specific examples can contain other materials in catalytic amounts, e.g., activators, of the cobalt type, and the like, as is well known.

As with the primer coating compositions, the polymerization or curing catalysts for the polyester resin coatings can be selected from a variety of known catalysts functioning to set or cure the polyester-monomer coating and being substantially inert toward the primer or base coating. The combination of primer and catalyst and polyester coating to result in a polyester coating containing highly desirable characteristics in accordance with my invention was unexpected, and especially in view of the fact that the polyester coating sets or cures on a thoroughly dry and sanded catalyst-containing sealer or undercoat.

As examples of catalysts which are suitable in the process of my invention, I can employ methyl ethyl ketone peroxide solution (60% in dimethyl phthalate), cyclohexanone peroxide (85% in a suitable plasticizer), known in the trade as Lupersol DDM and Lupersol JD–85, respectively, and obtainable from Lucidol Division of the Wallace and Tiernan Co., hydrogen peroxide, e.g., Albone, purchased from the Du Pont Co., and benzoyl peroxide. Hydrogen peroxide has a decided economic advantage over all of the organic peroxides, especially if the solvent system in the carrier is of a nature that will tolerate water, such as the alcoholic solution of polyvinyl pyrrolidone. Other applicable polymerization catalysts will be apparent to those skilled in the art.

The following specific examples are given to illustrate generally non-polyester undercoating compositions to which can be added a catalyst in minor amounts and wherein the catalyst added is effective in curing a subsequently applied polyester resin (uncatalyzed). The nitrocellulose sealer of Example 1 below is but one of a variety found useful for carrying the catalyst necessary to convert a subsequently applied polyester topcoating.

EXAMPLE 1

| | |
|---|---|
| ¼ second nitrocellulose, R.S., 30% ethyl alcohol [1] _____lbs__ | 155.2 |
| Xylol _____gals__ | 7.5 |
| Secondary isopropyl acetate _____gals__ | 5.4 |
| Denatured alcohol _____gals__ | 2.5 |
| Butyl acetate _____gals__ | 7.3 |
| Methyl isobutyl ketone _____gals__ | 11.4 |
| Lacquer reducer or thinnner [2] _____gals__ | 48.5 |

[1] The R.S. ¼ second is a grade designation. See "Nitrocellulose Handbook," copyrighted by Hercules Powder Co., 1948.

[2] The reducer is formulated as follows:

| | Gals. |
|---|---|
| Toluol _____ | 53.2 |
| Lactol spirits _____ | 28.0 |
| Isopropyl alcohol, 99% _____ | 12.6 |
| Secondary isopropyl acetate _____ | 12.6 |
| Methyl isobutyl carbinol _____ | 5.4 |
| Methyl isobutyl ketone _____ | 23.0 |
| Amyl acetate _____ | 6.0 |

In preparing the nitrocellulose sealer of this example, the ¼ second R.S. nitrocellulose is dissolved in the xylol, acetates, alcohol and ketone and then reduced and adjusted to the desired viscosity. The peroxide catalyzer can be stirred in just before the application, if desired. The nitrocellulose sealer of Example 1 is characterized by a weight of 7.5 lbs./gal. at a temperature of 78° F. and a viscosity of 31 to 33 seconds at 78° F. The nitrocellulose sealer when sprayed or coated by any suitable technique on a substrate, e.g., wood, air dries in 20 to 30 minutes and can be sanded.

EXAMPLE 2

A liquid polyvinyl butyral composition is prepared as follows:

| | Lbs. |
|---|---|
| Polyvinyl butyral, X, Y, L, H low viscosity [3] _____ | 40 |
| Denatured alcohol _____ | 108 |
| Toluol _____ | 252 |

[3] A grade designation. The polyvinyl butyral is a solid vinyl resin obtainable from The Bakelite Co. and is used as a primer base in specialty finishes.

EXAMPLE 3

A batch of styrenated alkyd primer composition is formulated as follows:

| | |
|---|---|
| Alkali refined linseed oil _____lbs__ | 9.77 |
| Dehydrated castor oil _____lbs__ | 3.26 |
| Glycerine, C.P. _____lbs__ | 2.27 |
| Pentaerythritol _____lbs__ | 2.30 |
| Phthalic anhydride _____lbs__ | 8.7 |
| Rubber grade styrene _____lbs__ | 13.90 |
| Ditertiary butyl peroxide _____lb__ | .40 |
| 2,5-ditertiary butyl hydroquinone _____gram__ | .182 |
| Powdered litharge _____lb__ | .004 |
| Xylol _____lbs__ | 38.27 |

The linseed and castor oils are heated with the glycerine to 200° F. in a kettle equipped for solvent processing. The litharge is next added and the mixture heated to 470° F., then half of the pentaerythritol is added while holding at 470° F. The remaining pentaerythritol is then added and the mixture cooled to 300° F. About 1.37 lbs. of xylol are then added, followed by the phthalic anhydride and ⅙ of the mixture of styrene and butyl peroxide. The mixture is heated to reflux (320–340° F.) and the remaining ⅚ of the mixture is added in ⅙ increments at 20-minute intervals. When all the styrene mixture is in the kettle, the mixture is refluxed to the desired viscosity. The temperature of the mixture is allowed to rise gradually to 400–440° F., then is cooled, reduced with the xylol, butyl hydroquinone added and the mixture thereafter filtered. Total time to heat is about 6 to 7 hours. The styrenated alkyd is characterized by a weight of 7.94 lbs./gal., a N.V.M. of 50% and a cure time of 30 seconds.

EXAMPLE 4

A short oil linseed alkyd composition is prepared as follows:

| | |
|---|---|
| Soya bean oil fatty acids-distilled _____lbs__ | 380 |
| Phthalic anhydride _____lbs__ | 636 |
| Glycerine, C.P. _____lbs__ | 330 |
| Sol. naphtha subs. _____gals__ | 31 |
| Xylol _____gals__ | 106 |
| Toluol _____gals__ | 58 |
| Lactol spirits _____gals__ | 30 |

The soya bean oil, phthalic anhydride and glycerine are heated in an inert atmosphere for 40 minutes at 356° F. The temperature is then raised to 475° F. in 40 minutes and the mixture held for 35 minutes, allowed to cool, and reduced with the rest of the ingredients. The mixture is characterized by an N.V.M. of 44 percent and a viscosity of T–U (Gardner-Holdt).

Another effective primer or sealer liquid is formulated as follows:

EXAMPLE 5

| | |
|---|---|
| Zinc chromate _____lbs__ | 3⅓ |
| Chrome yellow medium, C.P. _____lb__ | ⅛ |
| Chrome green medium, C.P. _____lb__ | 1/32 |
| Lampblack blue tone _____lb__ | 1/32 |
| Mica (micronized C-300) _____lbs__ | 2 |
| Lecithin _____lb__ | 1/16 |
| Bentone (hydrous aluminum silicate-montmorillonite) _____lb__ | ⅛ |
| Epoxy resin solution (Shell Chemical Company Epon 1001 CX75 resin)_____pints__ | 2.75 |
| Methyl isobutyl ketone _____do____ | 1⅝ |
| Butyl alcohol _____do____ | ½ |
| Toluol _____do____ | 2⅔ |
| Unmodified urea-formaldehyde resin __liq. ozs__ | 2.75 |

This resin is "Beetle 216–8," American Cyanamid Company, Technical Data Bulletin 845,111, characterized as follows—

| | |
|---|---|
| Solids ±2% _____ | 60% |
| Solvent— | |
| Butanol _____ | 30% |
| Xylol _____ | 10% |
| Color (Gard. 1933) _____ | 1 max. |
| Visc. at 25° C. _____ | S–V |
| Lbs./gal. _____ | 8.5 |

M.S. tolerance (KB 40–45), 300 lb. to 100 lb. resin solution, acid number (solid resin) 0.5–2.0.

| | |
|---|---|
| Alkyd silicone resin solution [1] (consisting of the following materials) _____pint__ | .75 |
| Distilled fatty acids (Neofat 280; composed of lauric-myristic fatty acids. See Trade Catalogue, "Armour Chem. Div. Bulletin on Neo-Fat Fatty Acids") _____lbs__ | 4.60 |
| Dimethyl triphenyl trimethoxy trisilane _lbs__ | 5.48 |
| Glycerine, C.P. _____lbs__ | 6.33 |
| Phthalic anhydride _____lbs__ | 9.20 |
| Xylol _____lbs__ | 23.60 |

[1] The resin is prepared by forming an alkyd from the fatty acids, glycerine and phthalic anhydride and then reacting and cobodying the alkyd with the trisilane in the presence of some of the xylol until a final low acid number is secured. Balance of xylol then added to reduce to about 50% N.V.M. Viscosity is then about $Z_2$ (Gardner-Holdt).

The above materials, after being ground, gave a primer weighing 10.9 lbs./gal. and having a viscosity of 70–75 K.V. at 80° F.

Other polymeric primer or base coating compositions were prepared from med-oil length soya, tall oil acid-DCO-alkyd, rosin-maleic-phenolic-DCO-alkyl and the like.

The following are examples of polyester top coating compositions adaptable for spraying, brushing, dipping or rolling over the catalyzed primer coatings described above.

EXAMPLE 6

A polyester resin base for a top coating for use on wood and primed surfaces is formulated as follows:

| | |
|---|---|
| Propylene glycol (industrial grade) _____lbs__ | 283.5 |
| Maleic anhydride _____lbs__ | 161.7 |
| Phthalic anhydride _____lbs__ | 244.1 |
| Xylol _____lbs__ | 55.1 |
| Tricresylphosphate _____lbs__ | 31.5 |
| Stabilizer (prepared as follows) _____lbs__ | 2.4 |
| Acetamidine hydrochloride [1] _____lbs__ | 20 |
| Propylene glycol _____lbs__ | 80 |

The acetamidine hydrochloride and the propylene glycol are heated together to 130 to 150° F. to dissolve.

| | |
|---|---|
| 4-tertiary butyl catechol _____ozs__ | 1.51 |
| Rubber grade styrene _____lbs__ | 283.5 |

[1] Described and claimed as stabilizer in copending application Serial No. 572,192, filed March 19, 1956.

The polyester top coating is characterized by a weight of 9.45 lbs./gal., a viscosity (Gardner-Holdt) of Y–Z at 77° F., an N.V.M. of 69% and can be baked in 30 minutes at 110° F. or air dried in from 2 to 3 hours at 77° F.

EXAMPLE 7

A clear liquid polyester coating (air dry) for wood, Masonite and the like is prepared as follows:

| | |
|---|---|
| Cab-O-Sil (diatomaceous earth) _____lbs__ | 12.5 |
| Polyester resin base [1] (comprising the following) _____gals__ | 65 |
| Propylene glycol, industrial grade _____lbs__ | 242.4 |
| Pentaerythritol _____lbs__ | 27.7 |
| Phthalic anhydride _____lbs__ | 236.1 |
| Dibutyl phthalate _____lbs__ | 51.4 |
| Xylol _____lbs__ | 26.5 |
| Stabilizer (of Example 6) _____lbs__ | 2.3 |
| 4-tertiary butyl catechol _____ozs__ | 1.5 |
| Rubber grade styrene _____lbs__ | 281.1 |

[1] The polyester resin base is characterized by a weight of 9.30 lbs./gal., viscosity (Gardner-Holdt) V–W at 77° F., a color C–2 (Gardner), N.V.M. 63–64%.

This resin is a propylene glycol phthlate-maleate resin modified with pentaerythritol and reacted in the presence of dibutyl phthalate. Its preparation is carried out without difficulty.

| | | |
|---|---|---|
| Rubber grade styrene | gals | 35 |
| Accelerator (prepared as follows) | gals | 2.3 |
|    Cobalt naphthenate (6% cobalt) | pints | 2⅝ |
|    Styrene | do | 5⅜ |
| Surfacing agent (prepared as follows) | gals | 2.3 |
|    Paraffine wax (123–125° C., M.P.) | ozs | 2½ |
|    Rubber grade styrene | pints | 8 |
| Masking agent [2] | gals | 1.3 |
| Maleic anhydride | lbs | 156.3 |

[2] The masking agent was prepared by mixing 1.0 gal. of Industrial Odorant No. 18301 obtainable from Fritzsche Bros., Inc., New York, New York, and 9.0 gallons of rubber grade styrene.

The above polyester coating composition is prepared by grinding the Cab-O-Sil (diatomaceous earth) in the polyester resin base for about 6 to 8 hours and then reducing with the styrene. The rest of the ingredients are then added and mixed well, and the viscosity of the mixture is finally adjusted with styrene to 27–28 (No. 4 Ford cup) seconds at 78° F. The composition is characterized by a weight of 8.7 lbs./gal. and an N.V.M. of 84±1%. It can be reduced with a mixture composed of 2 parts water and 8 parts isopropyl alcohol for spraying. The composition air dries in from 1 to 1½ hours.

EXAMPLE 8

A liquid air drying polyester top coating was prepared as follows:

| | | |
|---|---|---|
| Polyester resin (prepared as follows) | lbs | 67.25 |
|    Propylene glycol, industrial grade | lbs | 29.60 |
|    Maleic anhydride | lbs | 16.89 |
|    Phthalic anhydride | lbs | 25.51 |
|    Xylol | lbs | 5.75 |
|    Stabilizer of Example 6 | lb | .23 |
|    4-tertiary butyl catechol | oz | .15 |
|    Rubber grade styrene | lbs | 28.20 |
| This polyester resin is characterized by a weight of 9.4 lbs./gal., viscosity U–V (Gardner-Holdt) at 77° F. | | |
| Rubber grade styrene | gals | 28.37 |
| Accelerator (of Example 7) | gals | 2.25 |
| Surfacing Agent (of Example 7) | gals | 2.25 |

The top coating has a weight of 8.8 lbs./gal., and a viscosity (No. 4 Ford cup) of 19 seconds at 77° F.

Examples 6 and 7 are in reality one example of an air dry or low temperature cured coating. That which is set down as Example 7 is simply a reduced formulation of Example 6. In this instance, both the surfacing agent and cobalt are included. Such a formulation when sprayed over a sealer or primer containing methyl ethyl ketone peroxide or cyclohexanone peroxide would cure out readily at room temperature in the range of 110° F.

If a higher gloss polyester top coating is desired, it is only necessary to use an air-uninhibited alpha allyl ether-type polyester suitably reduced to spraying viscosity with styrene. In this instance, the surfacing agent would not be incorporated, and the cobalt would be used only if a low temperature cure (up to 135° F.) was contemplated. Also in this instance, if the coating is to be baked on (above 150° F.), the cobalt can be eliminated from the formulation, and the peroxide in the sealer can be of the less active (at low temperatures) variety, such as benzoyl peroxide.

EXAMPLE 9

A liquid polyester top coating was prepared as follows:

| | | |
|---|---|---|
| Propylene glycol, industrial grade (0.68 mol) | lbs | 15.43 |
| Glycerol alpha allyl ether (0.50 mol) | lbs | 19.71 |
| Maleic anhydride (0.50 mol) | lbs | 14.63 |
| Phthalic anhydride (0.50 mol) | lbs | 22.10 |
| Hydroquinone, technical grade (0.005%) | oz | .05 |
| Xylol (8%) | lbs | 5.75 |
| Stabilizer of Example 6 (0.25%) | lb | .23 |
| p-Quinone (0.005%) | oz | .12 |
| Rubber grade styrene | oz | .08 |

In preparing the top coating of this example, the glycol, glycerol, phthalic anhydride, xylol and hydroquinone are charged to a suitable apparatus and nitrogen is introduced below the surface of the liquid. The liquid is then heated to reflux, the nitrogen cut off and the batch refluxed for two hours. The water is removed from the reaction (maximum temperature 365°) while holding to an acid value of 48 to 50. When the acid value drops to 55 to 60, a gentle blow of nitrogen can be used to speed up the reaction. Cure should be taken constantly as control and as a precaution for gelation. The cure drops very slowly, and it should not be dropped below a 12″ cure before stripping in large size batch. When the acid value reaches 48 to 50, the heat is shut off and a strong nitrogen blow is applied to the surface to remove the xylene. When most of the xylene has been removed, outside cooling can be applied and a gentle nitrogen flow used. The mixture is cooled to 240° F., the stabilizer added, mixed for 10 minutes and then the quinone added. The mixture is further cooled to 220° F. and the styrene slowly added. The mixture is thereafter cooled to 160° F. under a nitrogen blanket before filtering.

The polyester resin is characterized by a Gardner-Holdt viscosity of R–S at 77° F., color (Gardner 1933) 2.3, acid number 32–35 and a weight per gallon of 9.5 at 77° F.

The above specific examples (1 through 5) are exemplary of primers or sealers that can be used to carry the catalyst to convert or set the subsequently-applied polyester top coating (Examples 6 to 9) given above. It should be understood that the examples given are by no means intended as limitations, since various formulations of undercoating and top coating compositions are well within the skill of the experts in the protective coating field. My invention is directed to the discovery that an undercoating composition can be adapted to carry a catalyst, to set or cure a subsequently-applied top coating of the type requiring a catalyst to effect such curing, provided the undercoating is not substantially affected by the catalyst itself. The top coating as defined above is of the type charcterized by ethylenic unsaturation and capable of polymerizing with a compatible cross-linking agent containing aliphatic carbon-to-carbon unsaturation.

Modification of my invention can include the application of the inter-reactive sealer-top coat process to systems whereby a polyester surface is applied on a molded object and the like. In prior art systems, a gelable resinous polyester mass is applied which requires the use of premixes of limited working life and the use of, for example, a catalyst gun. By the process of my invention, however, these pre-mixes of limited working life and the catalyst gun can be eliminated. The following demonstrates briefly such an adaptation:

EXAMPLE 10

A surface, for example, a glass surface, is sprayed with a film material comprising a polyvinyl alcohol reduced with a 1:1 mixture of methanol and water to a No. 4 Ford cup viscosity of 15″ at a temperature of 78° C., and to which is added 4 ounces per gallon of methyl ethyl ketone peroxide, i.e., a 60% methyl ethyl ketone peroxide in dimethyl phthalate. The film is allowed to dry, for example, for two hours, and a resinous polyester (containing cobalt) is then sprayed over the catalyzed film. The gelable polyester(s) which can be used are described, for example, in copending application Serial No. 441,152, filed July 2, 1954, now U.S. Patent 2,817,619. The polyester coat is then allowed to gel, and then a polyester-glass lay-up is placed over the gelled coat in the usual fashion.

Also, as noted, the polymerization catalyst can be added to the polyester top coating, and the accelerator and polymerizable monomer can be added to the sealer or primer.

EXAMPLE 11

To the sealer of Example 1 there is added 3 ounces per gallon of 6% cobalt naphthanate in styrene. This mixture is then sprayed on a wood surface, allowed to dry for 30 minutes and then sanded. To a polyester coating, i.e., of Examples 7 or 8, is then added 1% methyl ethyl ketone peroxide (as described above), and the coating applied to the accelerated sealer. This is a less advantageous method of securing reaction between the sealer and the topcoat.

Of course, it should be realized that the polymerizable monomer incorporated with the sealer (or other primer or base coating) should be substantially non-reactive therewith and that the polymerization catalyst incorporated or dispersed in said polyester coating functions only to cause the curing of the polyester coating when applied to the polymerizable monomer-containing sealer.

The table below illustrates tests conducted (on wood) with undercoatings of Examples 1 to 5, to which was added (if not already indicated in the example) 4 ounces per gallon of a catalyst (a 60% methyl ethyl ketone peroxide in dimethyl phthalate) after reduction to spraying viscosity. The base coat was allowed to dry (sanded or not) and a polyester top coat was then applied. The results are shown below with the polyester top coat of Example 7.

*Table*

| Undercoat | Top Coat | Result |
|---|---|---|
| Example 1 | Polyester | Rapid conversion. |
| Example 2 [1] | do | Do. |
| Example 3 | do | Do. |
| Example 4 | do | Do. |
| Example 5 | do | Slow conversion. |

[1] Tested on steel.

By rapid conversion in the above table is meant that the polyester top coating became hard in a matter of 1 to 3 hours at room temperature. The rapid or slow conversion can be affected by the type of catalyst added and also by the inherent reactivity of the polyester material. The catalysts employed in this process are well known in the art and function as expected. Extensive applications of the method of this invention have been conducted and in each of these applications and/or investigations, the results have been most satisfactory.

Thus, by the process of my invention, I have been able to eliminate the catalyst gun and pre-mixes having an impractical working life. In addition to metals, Masonite, etc., my invention is applicable to coating a variety of woods, viz., birch, maple, cherry, pine and other woods.

In operation, and referring to a method of application exemplary of my two-part protective coating system, a nitrocellulose sealer containing from about 2 to 4 ounces (or more or less) of a catalyst dissolved therein is applied to a substrate to be coated, e.g., a wood panel, by standard spray equipment, roller, brush, dipping, and allowed to dry at room temperature (in some cases for 20 to 30 minutes). The coating can thereafter be sanded, if desired, and then a top coating of a polyester resin (Example 7) is applied by any suitable method as described for the undercoat. The applied film sets or cures, i.e., is hard, in about one to three hours. In this case, the film is print free in about 40 minutes at room temperature. A film of Example 7 was tested and the results are shown below.

Cold check: O.K. 10 cycles RCA
100% R.H.: 100 hours. No change. 200 hours. Grain raising
Stains: NGR stains retain their color
Reagents: No effect—grape juice, tomato juice, lemon juice, vingear, coffee, tea, bacon fat, butter, mayonnaise, lard, lipstick, oleic acid or cottonseed oil (48 hours), hydrocarbons (24 hours), 3% hydrogen peroxide, 10% hydrochloric, sulfuric and nitric acids (48 hours), alcohol to evaporation. Weakness—acetone to evaporation. Iodine, prolonged contact. 10% sodium hydroxide
Print: No printing under 2 p.s.i. overnight after film is hard
Taber abrasion: 74.5, CS–10 wheel, 1000 gm. load, 1000 cycles
U.V. light: Greater effect on wood than on film
Gloss: 67
Crosscut adhesion: O.K.
Pencil hardness: F–H.

The sealers, primers or undercoating compositions of my invention can contain or be pigmented with pigment concentrates, as is well known. Additionally, the polyester top coating can also be pigmented and can be applied in heavy films, if desired, i.e., 30 to 40 mils, and the thick film will cure out readily when in contact with the catalyzed sealer. It should be understood that it is within the scope of my invention to sand a top polyester coat, apply a catalyzed sealer (such as a nitrocellulose) coat, and apply a second coat of polyester so that the thickness of the coating can be varied as desired. Also, my invention includes the use of masking agents for the odor-imparting coating compositions.

I have thus far indicated that in the two-part coating process of my invention, the polyester coating cures at room temperature in a short time. However, the curing or setting time can be accelerated by heating, for example, to 110° F. for 30 to 50 minutes, if desired.

Although no extended discussion has been attempted regarding the stability of the various compositions, I have found that a nitrocellulose sealer can retain a polymerization catalyst for extended periods of time, i.e., up to 4 to 5 months in lined containers at room temperature, and still give good results. It should also be stated, however, that contamination during manufacture or the presence of impurities in the solvents employed may affect the retention of activity. It can be appreciated that the stability of the catalyst in other undercoating compositions will vary according to the nature of the composition. Once a catalyzed primer coating has been applied to an appropriate substrate, I have also found that it will remain active, i.e., it will cure a subsequently-applied polyester-monomer coating even after two or three days' standing at ordinary room temperatures.

Having thus described my invention, it will be understood that various modifications can be made that will fall within its spirit and scope of the appended claims.

I claim:
1. A method of applying a polymerized coating of an unsaturated polyester upon a substrate which comprises the steps of applying a ground coat essentially consisting of an aqueous solution of hydrogen peroxide to said substrate, drying said ground coat, and applying said unsaturated polyester over said dried ground coat to rapidly cure said unsaturated polyester and form a polymerized coating over said substrate.

2. A method as set forth in claim 1 wherein a water miscible organic solvent is mixed into said aqueous solution of hydrogen peroxide to enhance its ability to spread over the substrate and to decrease the drying time.

3. A method as set forth in claim 1 wherein suitable water soluble thickeners are mixed into said aqueous solution of hydrogen peroxide to retard its penetration into said substrate.

4. A method as set forth in claim 1 wherein said aqueous solution of hydrogen peroxide is mixed with suitable water soluble film formers to retard its penetration into said substrate.

5. A method as set forth in claim 1 wherein the hydrogen peroxide is mixed into the aqueous phase of a sealer which retards its penetration into said substrate.

6. A method as set forth in claim 1 wherein said aqueous solution of hydrogen peroxide is mixed with an organic solvent solution of an organic solvent soluble film former which tolerates dissolved water over and above that required to dissolve said organic solvent soluble film former to retard its penetration into the substrate.

7. A method as set forth in claim 1 wherein said aqueous solution of hydrogen peroxide is applied to said substrate and allowed to dry, said substrate then being sanded and cleaned, and said unsaturated polyester being applied over said sanded and dried coating formed by said aqueous solution of hydrogen peroxide.

References Cited in the file of this patent

UNITED STATES PATENTS

| | | |
|---|---|---|
| 2,123,152 | Rivat | July 5, 1938 |
| 2,632,753 | Anderson | Mar. 24, 1953 |
| 2,927,867 | Hings | Mar. 8, 1960 |

UNITED STATES PATENT OFFICE
CERTIFICATE OF CORRECTION

Patent No. 3,159,500　　　　　　　　　　　　　　December 1, 1964

Arthur P. Dowling

It is hereby certified that error appears in the above numbered patent requiring correction and that the said Letters Patent should read as corrected below.

Column 1, line 32, for "substatnially" read -- substantially --; column 4, line 44, for "long time" read -- time long --; column 7, line 62, for "Mica (micronized C-300)" read -- Mica (micronized C-3000) --; column 8, line 30, for "-DCO-alkyl" read -- -DCO-alkyd --; same column 8, between lines 68 and 69, insert -- Maleic anhydride -----lbs--- 156.3 --; column 9, line 24, for "84" read -- 48 --; column 12, line 4, for "vingear" read -- vinegar --.

Signed and sealed this 20th day of April 1965.

(SEAL)
Attest:

ERNEST W. SWIDER　　　　　　　　　　　　　　EDWARD J. BRENNER
Attesting Officer　　　　　　　　　　　　　　Commissioner of Patents